June 14, 1932. U. C. TAINTON 1,862,869
METHOD OF ROASTING ORES AND CONCENTRATES
Filed Aug. 9, 1930 4 Sheets-Sheet 2

INVENTOR.
Urlyn C. Tainton
BY Townsend, Loftus & Abbett
ATTORNEYS.

June 14, 1932. U. C. TAINTON 1,862,869
METHOD OF ROASTING ORES AND CONCENTRATES
Filed Aug. 9, 1930 4 Sheets-Sheet 4

INVENTOR.
Urlyn C. Tainton.
BY Townsend, Loftus & Abbett
ATTORNEYS.

Patented June 14, 1932

1,862,869

UNITED STATES PATENT OFFICE

URLYN C. TAINTON, OF ST. LOUIS, MISSOURI

METHOD OF ROASTING ORES AND CONCENTRATES

Application filed August 9, 1930. Serial No. 474,148.

This invention relates to improvements in methods of roasting ores and concentrates, and the object of the invention is to increase the possible capacity of a furnace and to improve concentration of the sulphur dioxide in the gases obtained from it.

In the ordinary operations of roasting ores or concentrates for the elimination of sulphur, mechanical means are provided for the purpose of stirring the ore and exposing it to the action of the hot, oxidizing gas in the furnace. No means, however, is provided for the purpose of stirring the gases and bringing them into contact with the ore. My investigations have shown that the movement of the gases is at least equal in importance to that of the mechanical stirring or rabbling of the ore. This is particularly true in large furnaces where big spaces are available for the movement of the gases. In such structures there is a tendency for stagnant layers of dead gas to form a blanket over certain portions of the hearth, preventing contact of the oxidizing gases with the ore. This tendency is aggravated by the fact that sulphur dioxide gas in heavier than air and consequently, as the oxygen is depleted, the gas tends to lie in close contact with the ore and oxygen can only penetrate through this layer by a comparatively slow process of diffusion; convective movements being to a great extent, inhibited. This effect is especially marked in cases where it is intended to use the sulphur dioxide in the furnace gases for the production of sulphuric acid. In such cases, it is desirable to maintain a fairly high concentration of $SO_2$ in the effluent gas, preferably six per cent or more of $SO_2$ by volume. This requires that the volume of air admitted to the furnace be limited and consequently the gas velocity in the furnace is decreased. This causes slow roasting which reduces capacity and in turn again limits the amount of air that can be put in.

According to the present invention, means are provided whereby the gas will be kept in motion. Preferably these means are so disposed as to produce a uni-directional flow of gas considered in reference to any particular portion of the hearth area. This movement may be obtained by means of fans made of heat-resisting material placed inside the furnace and having motive power applied from some external source. Alternatively, the injector principle may be used whereby a small volume of air at high pressure is employed to impart movement to a large volume of gas. Other devices for obtaining the same end may be employed, the essential feature being to produce a sufficiently high velocity of the gas in the furnace to break up the layer of stagnant gas which would otherwise form and insulate the ore from proper contact with the oxidizing gases.

I have illustrated two forms of apparatus whereby agitation or circulation of the oxidizing gases may be obtained, in which—

Figure 1:
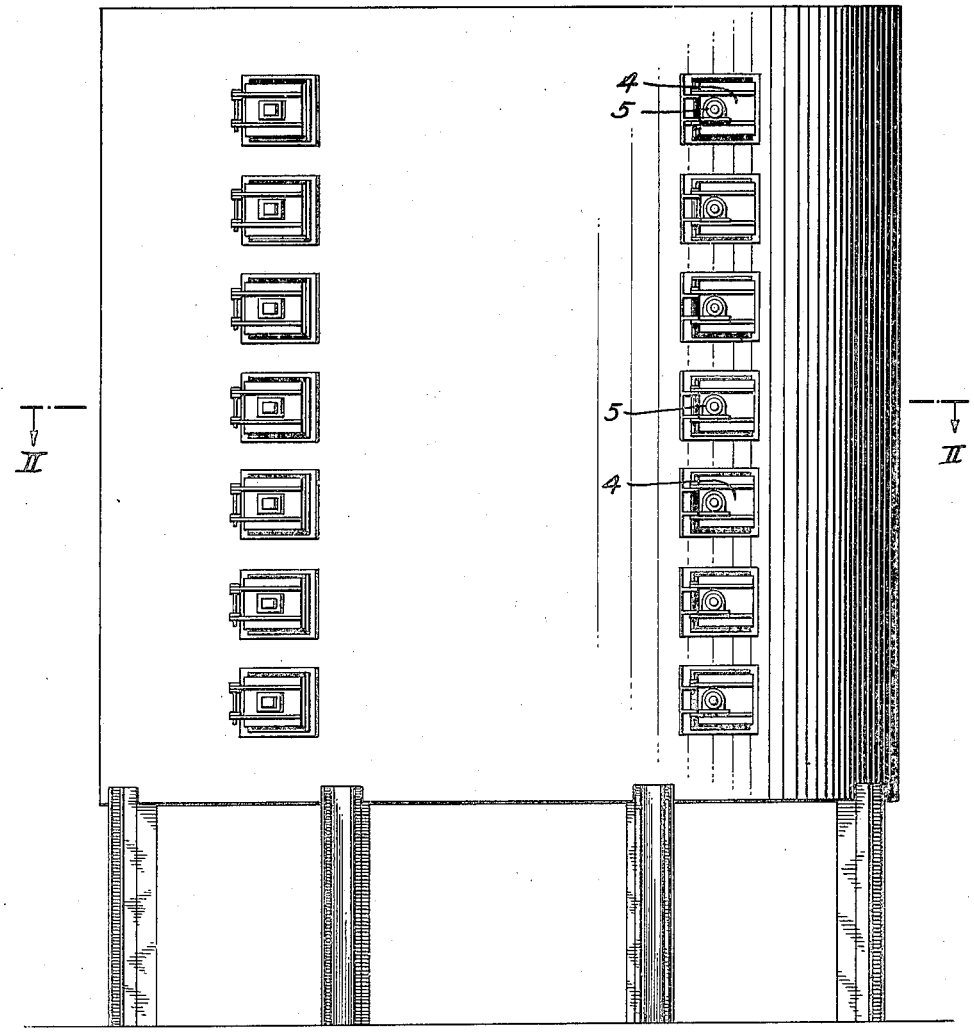
Fig. 1 is a side elevation of a MacDougall type of roasting furnace.
Figure 2:
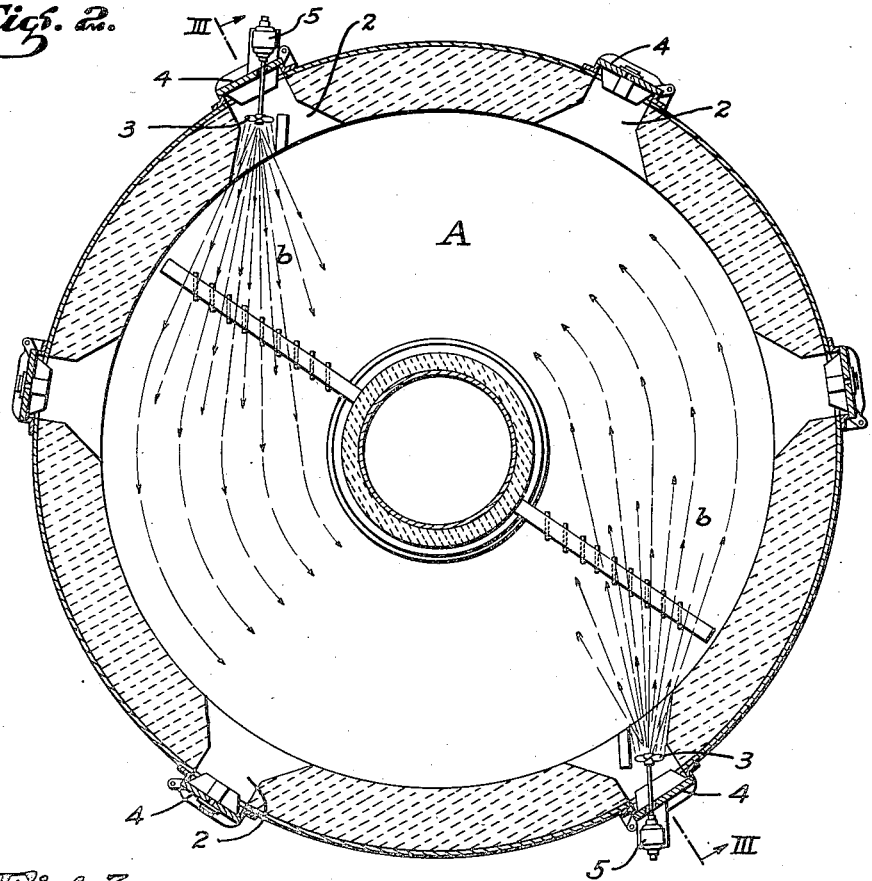
Fig. 2 is a cross section of the furnace taken on line II—II of Fig. 1.
Figure 3:
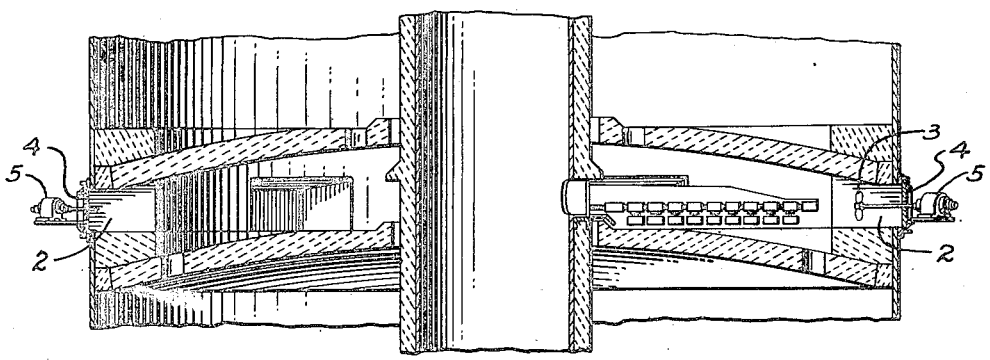
Fig. 3 is a vertical section taken on line III—III of Fig. 2.

Referring to the drawings in detail, particularly Figs. 1 to 3, inclusive, it will be noted that the furnace is substantially cylindrical in cross section and that it is divided into a plurality of superposed roasting compartments, generally indicated at A. Openings are provided in the exterior wall as indicated at 2 and these openings permit the introduction of fans such as shown at 3. The fans are so disposed as to create a rotary movement or continuous circulation of the hot oxidizing gases on the hearth as shown by the arrows $b$. The fan blades and shafts are made of heat-resisting alloy such as chrome steel or nickel-chromium. To secure rigidity, it may be desirable where high temperatures are encountered, to make the fan shafts hollow so as to permit a current of air to pass therethrough and to maintain them cool. The fan shafts pass through openings in the doors indicated at 4 and electric motors 5 or like devices are supported on the exterior side of the door to drive the fans.

Figure 4:
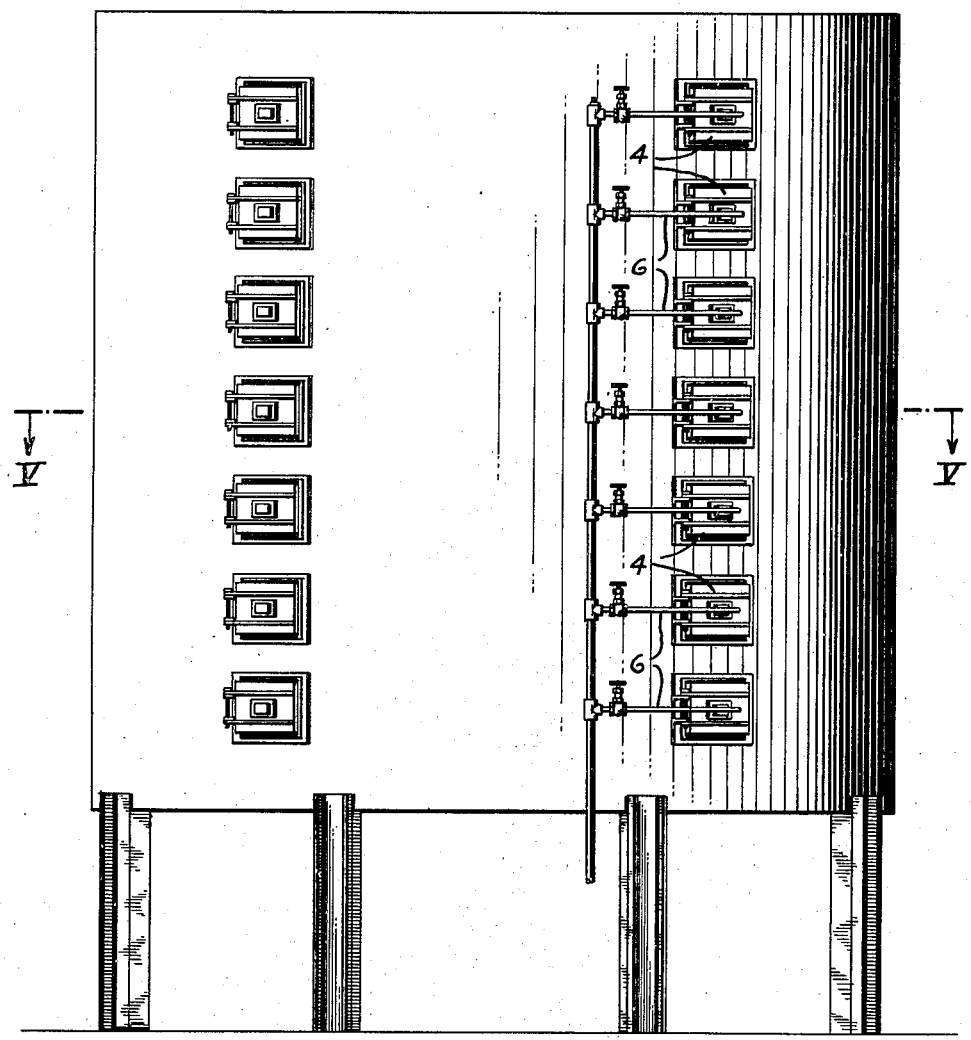
Fig. 4 is a side elevation of a MacDougall type of roasting furnace showing the application of a modified form of gas circulating device.
Figure 5:
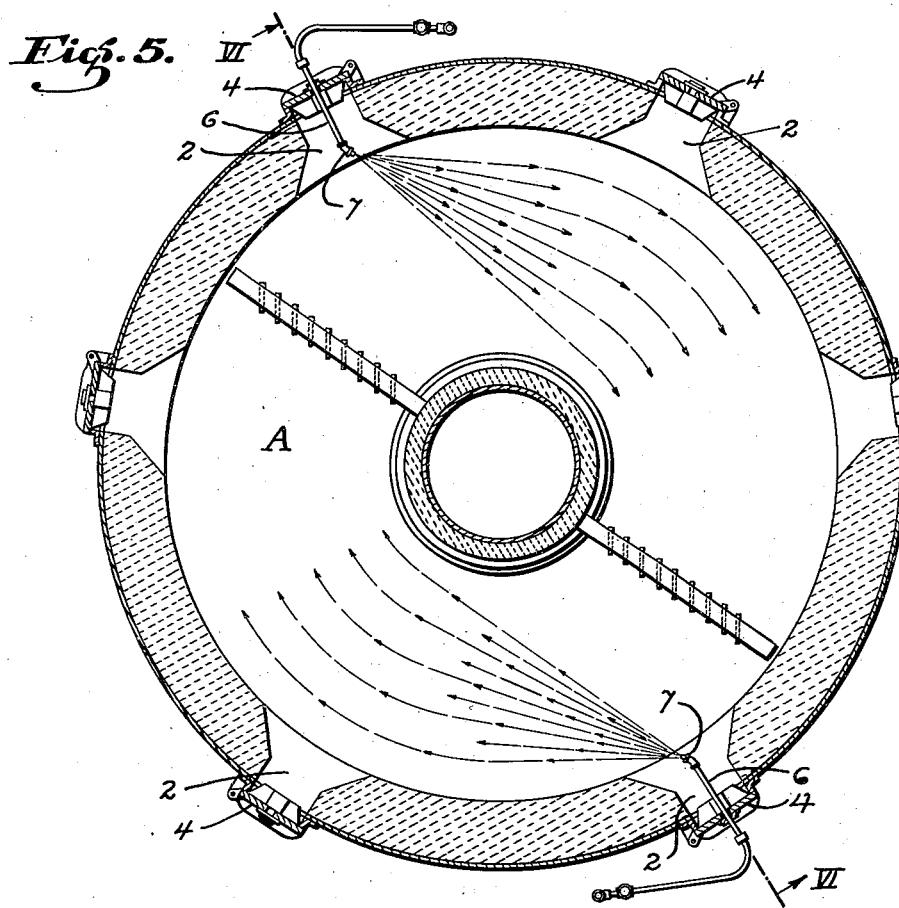
Fig. 5 is a cross section taken on line V—V of Fig. 4.
Figure 6:
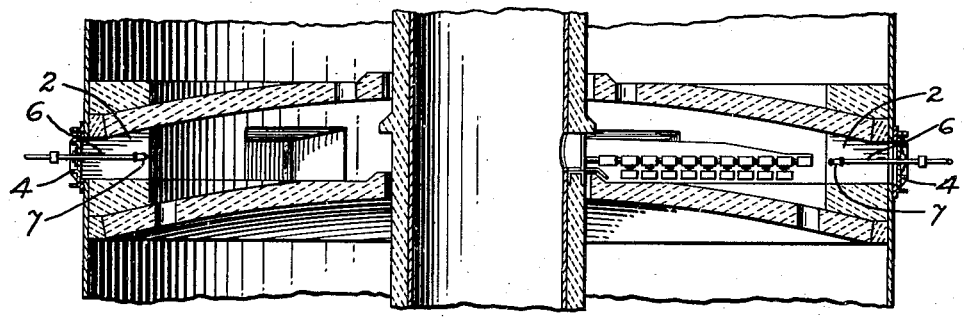
Fig. 6 is a vertical section taken on line VI—VI of Fig. 5.

Another method of obtaining circulation of the oxidizing gases within the furnace is shown in Figs. 4 to 6, inclusive. Here, instead of using fans, compressed air under high pressure is led through pipes 6 projecting through openings in the furnace wall or through the furnace doors. These pipes are provided with small nozzles 7 at their inner ends which are so positioned as to direct or impart rotational movement of the gases within the furnace. By this arrangement a small volume of air issuing at very high velocity imparts movement to the entire mass of gas, thus effectively preventing the formation of dead layers of gas in contact with the ore. It might be thought that this would result in excessive dilution of the furnace gas from the compressed air employed but, in point of fact, the quantity of air used is only a small percentage, say five or ten per cent of the total amount required for combustion. In a large furnace having hearths twenty-two feet inside diameter, good results may be obtained by the use of two nozzles on each hearth; each nozzle having an orifice about one-sixteenth of an inch in diameter and using from five to ten cubic feet of air per minute at a pressure of one hundred pounds per square inch.

Working in this manner, I have been able to increase very considerably the concentration of sulphur dioxide gas when comparison is made with an ordinary furnace because of the much more efficient contact of the oxygen with the ore on the hearth, and at the same time to increase the capacity of the furnace in point of possible tonnage of material roasted.

Having thus described my invention, what I claim and desire to secure by Letters Patent is—

1. A method of increasing the capacity of a roasting furnace and the quality of gas obtained therefrom, which consists in directing small jets of air under high pressure into the roasting furnace so as to agitate the gas immediately over the hearth and thus prevent any layer of stagnant gas which would otherwise form and insulate the ore from contact with the oxidizing gases, and in a manner to impart motion to the oxidizing gases and to continuously bring the oxidizing gases into intimate contact with the ore being roasted.

2. A method of increasing the capacity of a roasting furnace having an annular roasting chamber formed therein, which consists in continuously directing small jets of air under high pressure through an outer wall of the furnace and tangentially into the roasting chamber so as to break up or prevent any layer of stagnant gas which would otherwise form and insulate the ore from proper contact with the oxidizing gases, and also to impart motion to the oxidizing gases in a manner to bring the oxidizing gases into intimate contact with the ore being roasted.

URLYN C. TAINTON.